Sept. 8, 1970  G. M. UNGERLEIDER  3,527,585
METHOD AND APPARATUS FOR THE CONTROL OF THE
HEATING VALUE OF NATURAL GAS
Filed Dec. 1, 1967  2 Sheets-Sheet 1

G. M. Ungerleider INVENTOR

BY
Donald F. Wohlers
PATENT ATTORNEY

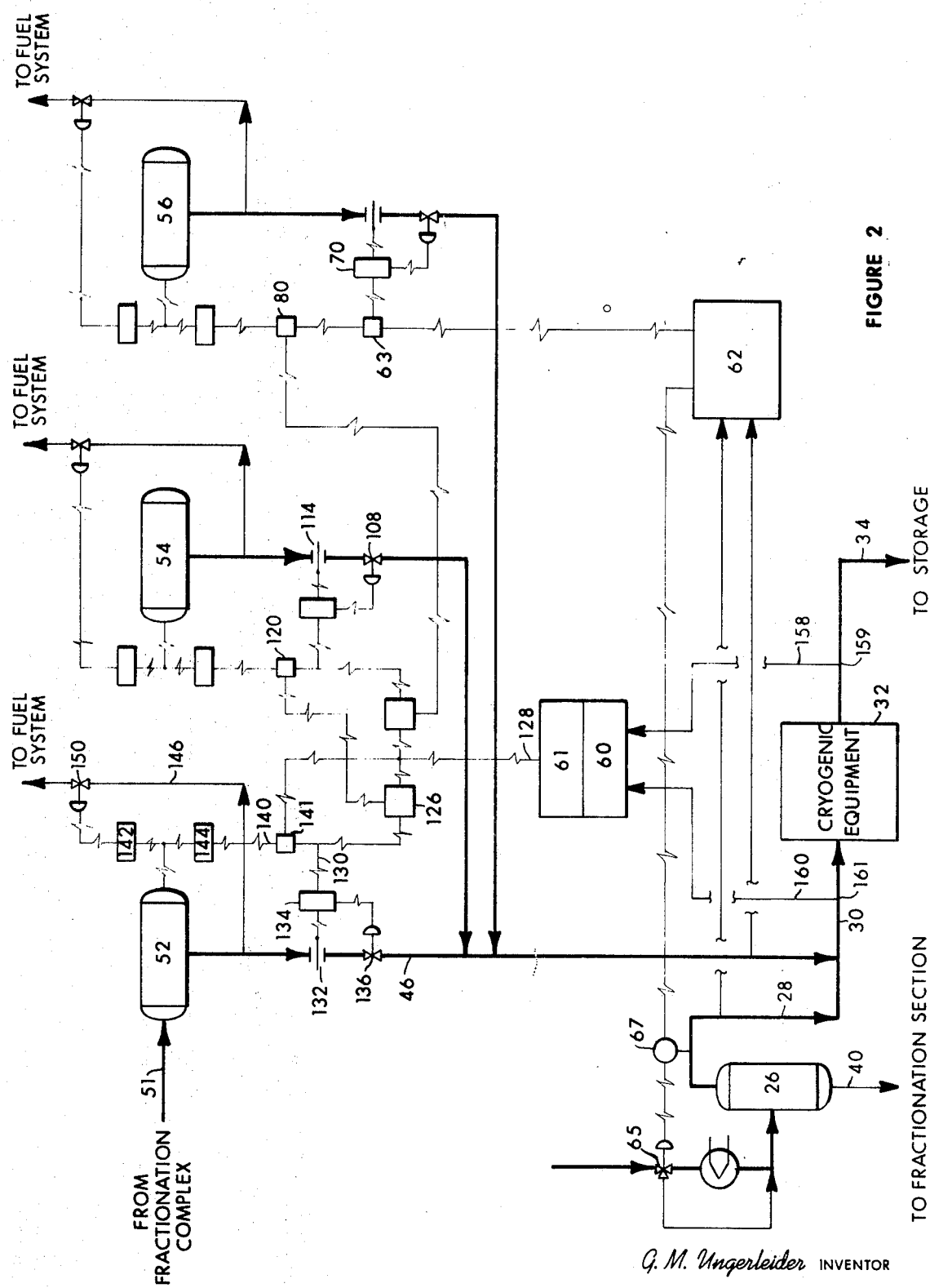

United States Patent Office 3,527,585
Patented Sept. 8, 1970

3,527,585
METHOD AND APPARATUS FOR THE CONTROL OF THE HEATING VALUE OF NATURAL GAS
Gerald M. Ungerleider, Succasunna, N.J., assignor to Esso Research and Engineering Company, a corporation of Delaware
Filed Dec. 1, 1967, Ser. No. 687,345
Int. Cl. F25j 3/00
U.S. Cl. 48—196
8 Claims

ABSTRACT OF THE DISCLOSURE

Automatic control of the heating value and composition of a liquefied natural gas product derived from a natural gas and a condensate feed comprising light hydrocarbons produced with the natural gas and existing as liquid at pipeline transmission pressures. These light hydrocarbon streams which enter the plant as part of the feed are fractionally distilled and are then automatically added in desired quantities to the natural gas at a point just prior to liquefaction.

BACKGROUND OF THE INVENTION

The present invention relates generally to a method and apparatus for controlling the heating value of a gaseous fuel. More particularly, the process of the invention provides a method for regulating the heating value of gaseous fuel by the automatic addition or deletion of light hydrocarbon fractionation distillate streams. The teachings of the instant invention are particularly applicable when used in conjunction with a natural gas liquefaction facility.

Natural gas is often available in areas remote to where it will be ultimately used. Quite often the source of this fuel is separated from the point of utilization by a large body of water and it may then prove necessary to effect bulk transfer of the natural gas by large tankers designed for such transport. Under these circumstances, economics dictate that the natural gas be liquefied. Again, considering economics, it is highly desirable that the liquefied natural gas, hereinafter referred to as LNG, be transported at substantially atmospheric pressure. Under these conditions the LNG is at a temperature in the range of −258°. This temperature represents the boiling point of methane at atmospheric pressure. It is to be noted, however, that the LNG often contains amounts of other hydrocarbons such as ethane, propane, butane, pentane and the like, and these will vary the boiling range of the LNG. It will also be appreciated that small quantities of these components can vary the heating value of the LNG to a considerable extent.

When the LNG arrives at the point of utilization, it is, of course, in liquefied form and consequently becomes necessary to regasify it before it is used as a fuel. One of the primary marketing considerations to be evaluated is whether the natural gas as liquefied will result in a product which meets the ultimate customer's specifications. For example, the fuel gas customer may desire a gas having a specific heating value or be in a specific heating value range so that the product may be interchangeable with existing fuel or natural gas sources.

It will be appreciated by those skilled in the art that prior to the normal liquefaction of natural gas, it is often either necessary or advantageous to perform certain preparatory operations. These operations include the following: (1) treating to remove acid gas if present, and (2) drying to remove water, and (3) chilling to remove the heavy ends of the natural gas as condensate. As in the prior art, the resulting lean natural gas could then be liquefied; however, it would then often not meet the customer's requirements concerning heating value. Moreover, little liquid petroleum gas (LPG) could be extracted from this lean LNG which would eliminate possible attractive LPG markets at the LNG receiving terminal. Additionally, the lean natural gas would require liquefaction at a lower temperature, thus increasing the power cost per mole liquefied. An additional prior art disadvantage resulting from the above preparatory operations is the need for separate storage facilities for the removed heavy ends.

In contrast, the teachings of the instant invention provide a method for obtaining LNG having a desired heating value while avoiding the above-mentioned disadvantages. Thus, the controlling of the LNG heating value is economically and practically integrated with the liquefaction process in a manner which not only improves the overall operation of the LNG plant but which also affords the advantages of avoiding separate storage facilities and producing a product which can take advantage of available LPG markets.

SUMMARY OF THE INVENTION

According to the instant invention, the above highly desirable results may be achieved by a system and methods of operating the same, which system is designed to automatically regulate the composition and hence the heating value of the LNG produced in the liquefaction facilities. This is accomplished by adding light distillate, e.g. propane, butane and pentane to the lean natural gas, the distillate being obtained from a fractionation of the condensate formed in the chilling operation required to remove the heavy ends ($C_6$ and above).

The control of the heating value of the LNG within the required limits is accomplished by continuously burning a slipstream of LNG product in a calorimetric device which determines the heating value of the burning sample. A controller, integral with the calorimetric device, then compares the signal from the calorimetric device with a manually selected heating value setpoint and transmits actuating signals. The valves controlled by these signals in turn control the flow of depropanizer, debutanizer and depentanizer overhead distillate streams from normal reflux accumulator drums into the main natural gas stream to be liquefied. As will be readily appreciated, the addition of these distillate streams enrich the LNG product and hence raise its heating value.

For a high heating value setpoint which usually is the normal mode of operation, i.e. for LPG production with the LNG, the B.t.u. controller output signal will open the depropanizer overhead distillate flow control valve until the manual selected heating value setpoint is achieved. The controller will then maintain this setpoint. Excess depropanizer overhead distillate may advantageously be sent to a fuel system as will hereinafter be more fully described. In the event that the outflow of the depropanizer overhead distillate exceeds the inflow, i.e. there exists an insufficient amount of depropanizer overhead to meet the demand required by the controller, the butane distillate flow valve is automatically opened by a logic system to be subsequently described. The same type of system serves to feed in depentanizer distillate if and when the supply of debutanizer overhead proves inadequate.

Accordingly, an important object of the instant invention is to provide an efficient method for adjusting the heating value of a normally gaseous fuel.

Another important object is to automatically adjust the heating value of a natural gas prior to the liquefaction of the gas.

Yet another object of the instant invention is to provide a method achieving a desired heating value for a natural gas stream to be subsequently liquefied, which method also improves the overall operation of the liquefaction facility.

Other objects as well as a fuller understanding of the invention may be ascertained by referring to the following description and claims taken in conjunction with the accompanying drawings.

BRIEF DESCRIPTION OF THE DRAWINGS

FIG. 2 illustrates schematically the heating value control system of the instant invention and represents the details of what is contained within the area enclosed by the dotted lines in FIG. 1.

Referring to FIG. 1 in detail, reference numeral 2 represents a transmission pipeline wherein the natural gas feed is flowing. The gas in transmission pipeline 2 is fed via the line 4 to a gas treating tower 6 wherein any acid gas present is removed. The acid free gas is then conducted to a first feed chiller 10. During its passage through chiller 10, the heavy ends in the feed are condensated and separated out in the separator drum 14. The gaseous overhead from drum 14 is conducted to a vapor drier 20 via the line 18, the condensed heavy ends being fed through the lines 38 and 42 into a fractionation complex 44.

Figure 1:
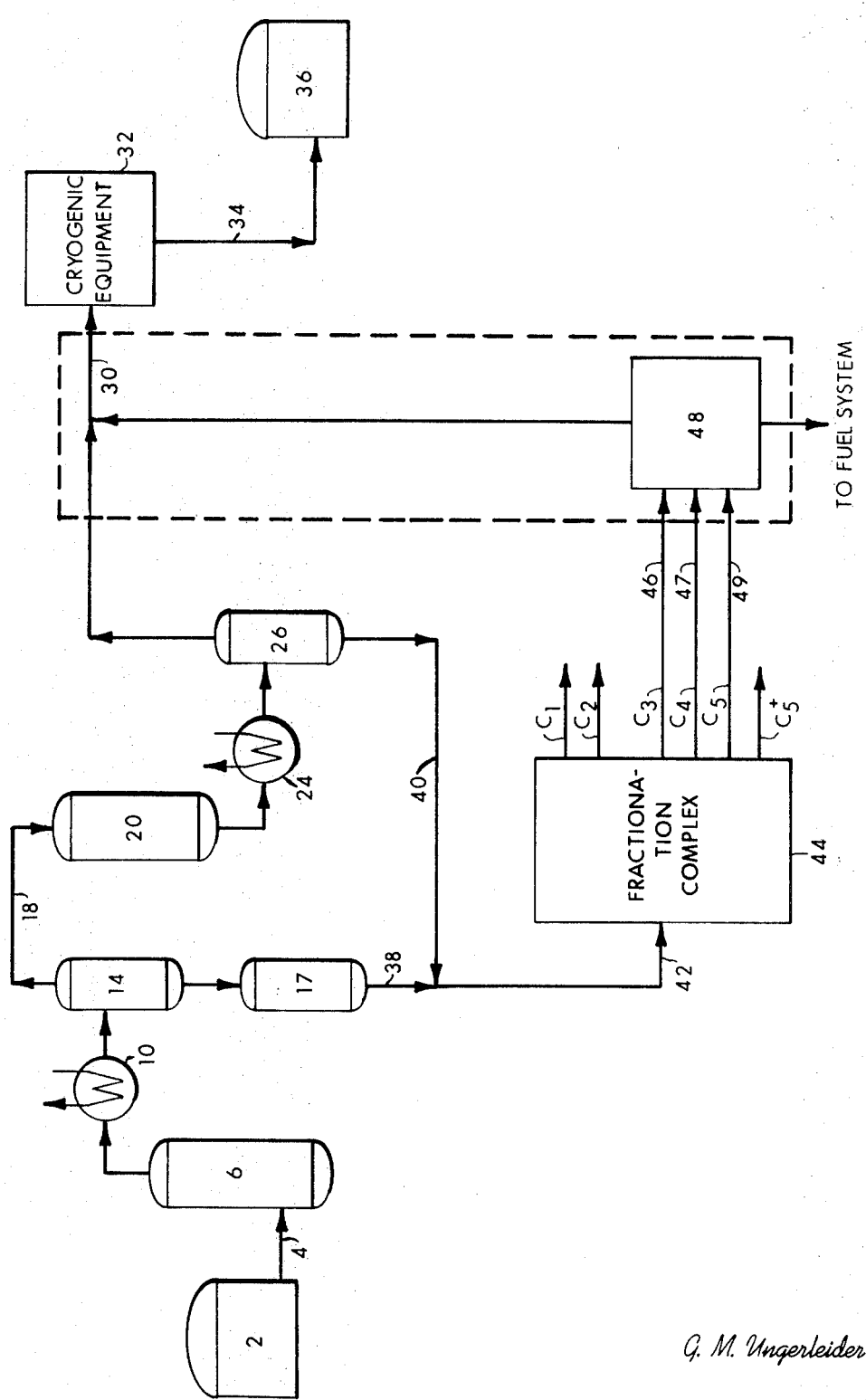
FIG. 1 is a schematic flow plan of a typical natural gas liquefaction plant in which the method of the instant invention may be suitably employed.

The dried vapors exiting drier 20 are conducted through a second feed chiller 24 and upon exit therefrom enter a second feed separator drum 26. In drum 26 additional condensate is formed, said condensate containing the residual heavy ends and being composed mainly of $C_3$ to $C_5$ hydrocarbons. Some lighter hydrocarbons are also present. This condensate is merged via the line 40 into the first condensate stream after the latter has been dried in drier 17, the combined stream entering fractionation complex 44.

Fractionation complex 44 splits its combined condensate feed into a series of hydrocarbon distillates, each rich in a particular hydrocarbon. The $C_1$, $C_2$ and $C_5^+$ streams are then fed to auxiliary equipment (not shown) such as fuel supply and/or refrigerant make-up supply, which form a part of the liquefaction facilities.

The $C_3$, $C_4$ and $C_5$ streams (which may also in part be used as fuel or refrigerant make-up if in sufficient supply) are conducted via the lines 46, 47 and 49 to the heating value control complex 48, which is enclosed within the dotted lines in FIG. 1. In complex 48, as will be discussed in greater detail in conjunction with the description of FIG. 2, controlled portions of each of these distillate streams are blended into the main feed stream in the line 30 just prior to the liquefaction of the main feed stream in the cryogenic complex 32. Upon liquefaction in complex 32, the enriched LNG is fed via the line 34 to a suitable storage tank 36 from which it is ultimately transported to points of utilization.

Referring now to FIG. 2, a schematic heating value control complex designed in accordance with the teachings of the instant invention is shown.

A calorimetric device 60, equipped with an associated controller 61 in conjunction with logic circuitry, is used to control the heating value of the LNG product in the liquefaction process. In calorimetric device 60 two sample streams, 160 and 158, of the natural gas product are continuously burned to determine the heating value of each. The controller 61 compares the signals from the calorimetric device with a manually selected heating value setpoint and transmits an electronic signal which actuates the above-mentioned logic circuitry, as will be more fully explained hereinafter.

Concerning the sampling of the LNG sent to calorimetric device 60, good design practice requires that a sample be withdrawn from a well mixed single phase system so that representative sampling is, therefore the source of the sample is usually located immediately downstream of the cryogenic equipment LNG outlet, e.g. at point 159. Upstream the LNG is a two-phase mixture. While monitoring at this point alone would assure uniformity of the sample, it would possibly introduce a potentially adverse effect on the stability of the control system in that a time lag would be produced due to time required for the material to flow through the cryogenic equipment 32. To guard against this possibility, additional flexibility is provided according to the teachings of the instant disclosure by specifying another sample withdrawal point upstream of the cryogenic equipment at 161. Sample withdrawal at point 161 and thence through the line 160 eliminates the lag through the cryogenic equipment complex 32. By locating tap 161 at a point sufficiently downstream of the line 46 junction (e.g. about 25 feet) and by utilizing a multi-holed T manifold (not shown) located in the LNG main feed line 30, the turbulence created by the T will assure adequate mixing of the two-phase mixture just prior to sampling.

However, if any maldistribution should occur, it would be biased in the direction of a lighter, lower heating value sample than the total fluid represents since inertia would tend to prevent the heavier liquid from changing direction and entering the sample holes. Consequently, this bias would drive the LNG product heating value to the maximum value obtainable for the particular feed being processed faster than if using the downstream tap, but accuracy may suffer slightly. Thus, the reason for the downstream tap is that automatically or under operator control the upstream tap bias can be adjusted to give both high speed of response and accuracy.

It is felt that the specification of the two sample taps will provide a system with both stable control and accurate monitoring characteristics.

Thus, the calorimetric device 60 receives and continuously burns samples obtained from the points 161 and 159 to determine the heating value of the LNG product and its associated controller 61, then compares the signal resulting from the burning.

For a desired heating value setpoint, which is the normal mode of operation, i.e. to maximize the LNG product heating value, the B.t.u. controller 61 will generate an output signal via the signal line 128 through the relay comparator 126 and thence via the signal line 130 to a flow controller 134. Controller 134 controls the valve 136 on the line 46 from a depropanizer overhead distillate drum 52. The depropanizer distillate flows through the line 46 (its rate being ascertained by the orifice 132) and into the main feed line 28. This combined stream then enters the cryogenic complex 32 via the line 30.

The calorimetric device and its associated controller 61 will continue to open the depropanizer overhead distillate flow control valve 136 until either (1) the manually selected setpoint is reached (the controller will then maintain this setpoint with excess depropanizer overhead distillate being automatically sent to an auxiliary system, e.g. fuel system, via the level remote controller 142 and its associated valve 150 on the line 146) or (2) the outflow of the depropanizer stream from the distillate drum 52 exceeds the inflow from the line 51. In the latter case, valve 136 will continue to be opened since the B.t.u. controller continues to signal flow remote controller 134 as the demand for more enriching liquid (i.e. depropanizer overhead distillate) continues to exist. At the same time the distillate drum level control valve 150 closes in an attempt to try to maintain normal liquid level. When this valve reaches its full closed position, the signal from the second "backstop" level controller 144, on the drum 52, sends an overrides signal via the line 140 to a low signal select switch 141 which in turn overrides the controller signal. The "backstop" level controller 144 now resets the flow control valve 136 to maintain normal liquid level in drum 52.

Concurrent with the above control functions, the B.t.u. controller output signal, which is proportional to the depropanizer overhead distillate flow rate which would enrich the LNG product to the desired setpoint heating value, and the output signal from the low signal select switch 141, which is proportional to the amount of depropanizer overhead distillate which is available, are sent to a relay comparator 126 whose output signal is proportional to the deficiency (if any) of depropanizer distillate required to enrich the LNG product heating value to the setpoint value. The output signal from comparator 126, which is modified by the suitable factor to equilibrate the factors from orifice meters 132 and 114 and the heating value per unit volume of the depropanizer and debutanizer distillate overhead streams, begins to open the debutanizer overhead distillate flow valve 108.

The same type of logic circuitry (using automatic low signal select switches 120 and 80) prevents the B.t.u. controller from draining the debutanizer or depentanizer distillate drums (54 and 56 respectively) on high demand for enriching liquid.

For a low heating value setpoint, which would be required for customer performance guarantee tests and overall unit flexibility evaluations, the system could be turned down in reverse order to the sequencing described above. In this case the normal level controller 142 holds the level control valve in the full closed position until the automatic low signal select switch 141 overrides the "backstop" level controller 144 in favor of the B.t.u. controller output signal.

CONTROL OF $C_5^+$ IN LNG FEED

Laboratory tests have thus far indicated that the maximum concentration of $C_5^+$ material in the LNG feed without causing freezeout of those heavy ends at cryogenic temperatures is 1.0% $C_5^+$.

Careful monitoring of both the overhead from the feed separator drum 26 and the liquid B.t.u. control stream in line 46 (preferably by chromatographic methods) is thus required to prevent high concentrations of heavy ends.

The two streams are monitored separately because downstream of the junction of the overhead vapor and the enriching liquid the fluid is two-phase and a sample containing representative concentrations of a component present in small amounts would be very difficult to obtain. The other prime advantage to separate monitoring of the two streams is that the source of the heavy ends can be pinpointed immediately and automatic corrective action taken.

Should the $C_5^+$ concentration in the feed separator drum overhead stream (i.e. in line 28) exceed the setpoint value, the chromatograph-controller 62 cascaded with the feed separator drum temperature controller 67 would reset that temperature controller to a lower operating temperature in the drum. This would close down the bypass valve 65, thus reducing the concentration of $C_5^+$ in overhead.

Should the $C_5^+$ concentration in the B.t.u. control liquid stream 46 exceed the setpoint value, the chromatograph-controller 62 cascaded with the flow controller 70 on the depentanizer distillate stream would override (through a low signal select switch 63) the B.t.u. controller signal and reset that flow controller to a lower flow rate, thus reducing the concentration of $C_5^+$ in the B.t.u. control liquid stream.

It should be understood that the specific structures and operational procedures herein illustrated and described are intended to be representative only, as certain changes may obviously be made without departing from the clear teachings of the disclosure. For example, the B.t.u. control system of the instant invention may find use in other related fields. Thus, where an attractive LPG (liquefied petroleum gas) market is available at the LNG receiving terminal, this system could be used to control and record the amount of recoverable LPG added to the LNG. A proportioning device added to the existing system could make control of both LNG and LPG quality specifications possible.

A suitably altered but still basic B.t.u. control system as herein taught could also be used to control the heating value and composition of a town gas downstream of a reformer and LPG fractionator system used in many LNG receiving terminals.

Thus, in determining the full scope of the invention, reference should be had to the following appended claims.

What is claimed is:

1. In a process for liquefying natural gas, said process being of the type characterized by the preliquefaction step of chilling to remove the heavy ends of the natural gas as condensate, the improvement which comprises the following steps in combination:
   (a) fractionating said condensate to obtain a plurality of fractionation streams each rich in a particular hydrocarbon;
   (b) burning a sidestream of the uncondensed portion of said natural gas to determine its heating value; and thereafter
   (c) injecting predetermined portions of selected ones of said plurality of fractionation streams into the uncondensed portion of the natural gas whereby the heating value of said uncondensed portion of said natural gas is adjusted to a desired point.

2. The process of claim 1 further characterized in that said injecting takes place just prior to the liquefaction of said natural gas.

3. The process of claim 1 wherein said burning is done continuously and automatically and said preselected portions of said plurality of fractionation streams are selected and injected automatically in response to a signal automatically generated during said burning.

4. A method of controlling the heating value of a natural gas which comprises the following steps in combination:
   (a) chilling said natural gas to condense its heavy ends;
   (b) fractionating the condensed heavy ends to obtain a plurality of fractionation streams each rich in a particular hydrocarbon;
   (c) continuously and automatically removing and burning a sidestream of the uncondensed portion of said natural gas to determine its heating value;
   (d) automatically generating an electrical signal proportional to the heating value determined in step (c); and
   (e) automatically injecting into said uncondensed portion of said natural gas in response to said signal predetermined amounts of individual ones of said fractionation streams whereby the heating value of said natural gas is adjusted to a desired point.

5. In the liquefaction of natural gas characterized by the preliquefaction of the heavy ends of the natural gas as condensate by chilling means the improved apparatus which comprises:
   (a) fractionating means to separate said condensate into a plurality of fractionation streams each rich in a particular hydrocarbon;
   (b) burning means to burn a sidestream of the uncondensed portion of said natural gas to determine its heating value; and
   (c) injection means to inject predetermined portions of said plurality of fractionation streams into the uncondensed portion of the natural gas whereby the heating value of said uncondensed portion of said natural gas is adjusted to a desired point.

6. An apparatus for controlling the heating value of a natural gas which comprises:
   (a) cooling means to condense the heavy ends of said natural gas;
   (b) fractionating means to separate said condensed heavy ends into a plurality of fractionation streams each rich in a particular hydrocarbon;

(c) means for continuously and automatically removing and burning a sidestream of the uncondensed portion of said natural gas to determine its heating value;

(d) a second means for automatically generating an electrical signal proportional to the heating values determined in step (c); and (e) injection means to automatically add to said uncondensed portion of said natural gas predetermined amounts of individual ones of said fractionation streams in response to said signal whereby the heating value of said natural gas is adjusted to a desired point.

7. The apparatus of claim 6 wherein said plurality of fractionation streams each rich in a particular hydrocarbon consists of propane, butane and pentane.

8. The apparatus of claim 7 wherein means are provided for sequentially adding said butane and said pentane when the supply of said propane becomes insufficient.

References Cited

UNITED STATES PATENTS

| | | | |
|---|---|---|---|
| 1,708,958 | 4/1929 | Schmidt | 48—180 |
| 1,912,044 | 5/1933 | Schmidt | 137—6 X |
| 3,277,655 | 10/1966 | Geist et al. | 62—29 |
| 3,285,719 | 11/1966 | Bodle et al. | 48—196 X |
| 3,407,052 | 10/1968 | Huntress et al. | 48—196 |

MORRIS O. WOLK, Primary Examiner

R. E. SERWIN, Assistant Examiner

U.S. Cl. X.R.

62—29; 137—6, 90